Jan. 8, 1952              J. BUGOS              2,581,356
SELF-LOADING DEVICE FOR SHAKER CONVEYERS
Filed Feb. 27, 1947              3 Sheets-Sheet 1
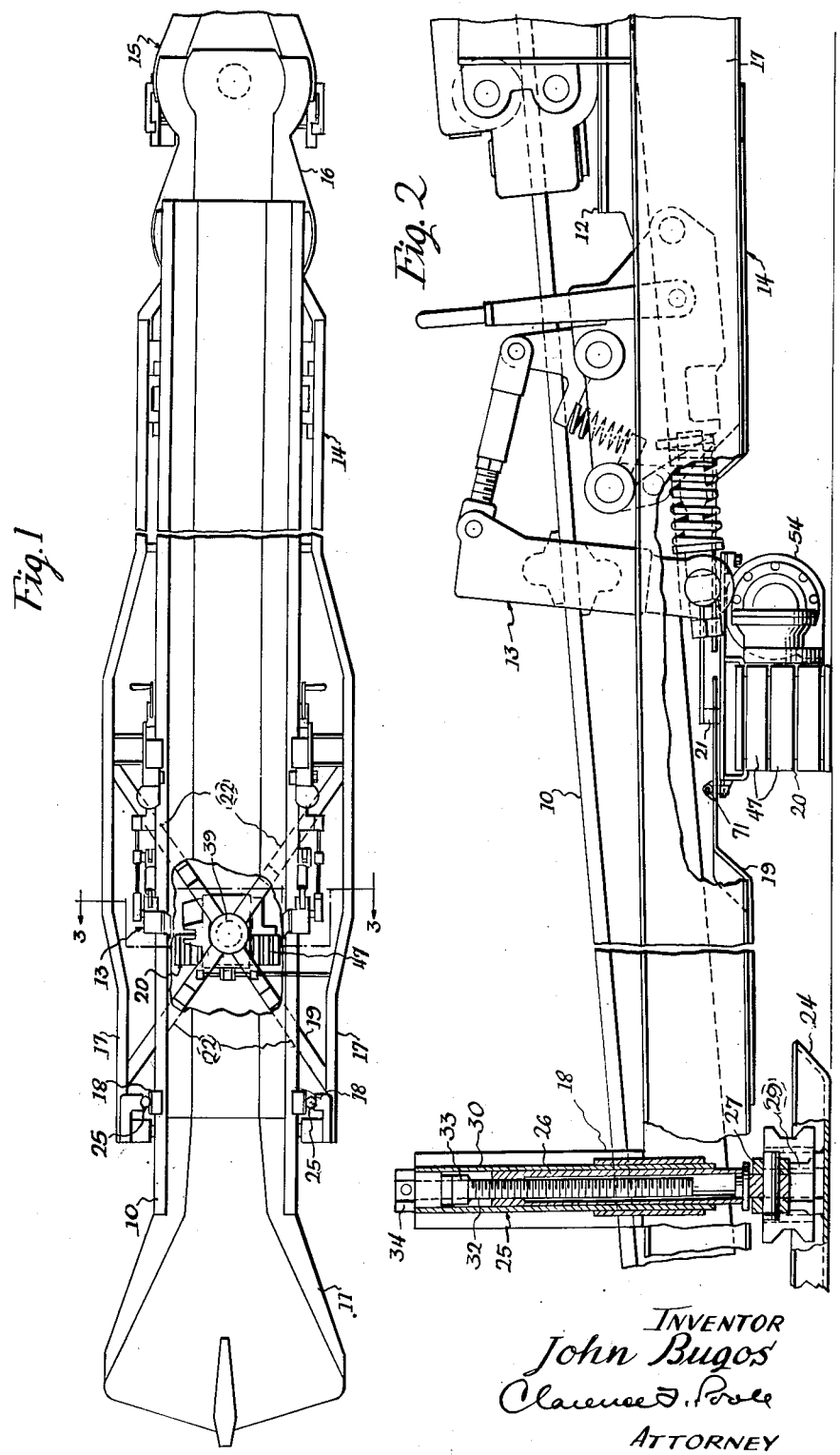
INVENTOR
John Bugos
Clarence D. Poole
ATTORNEY

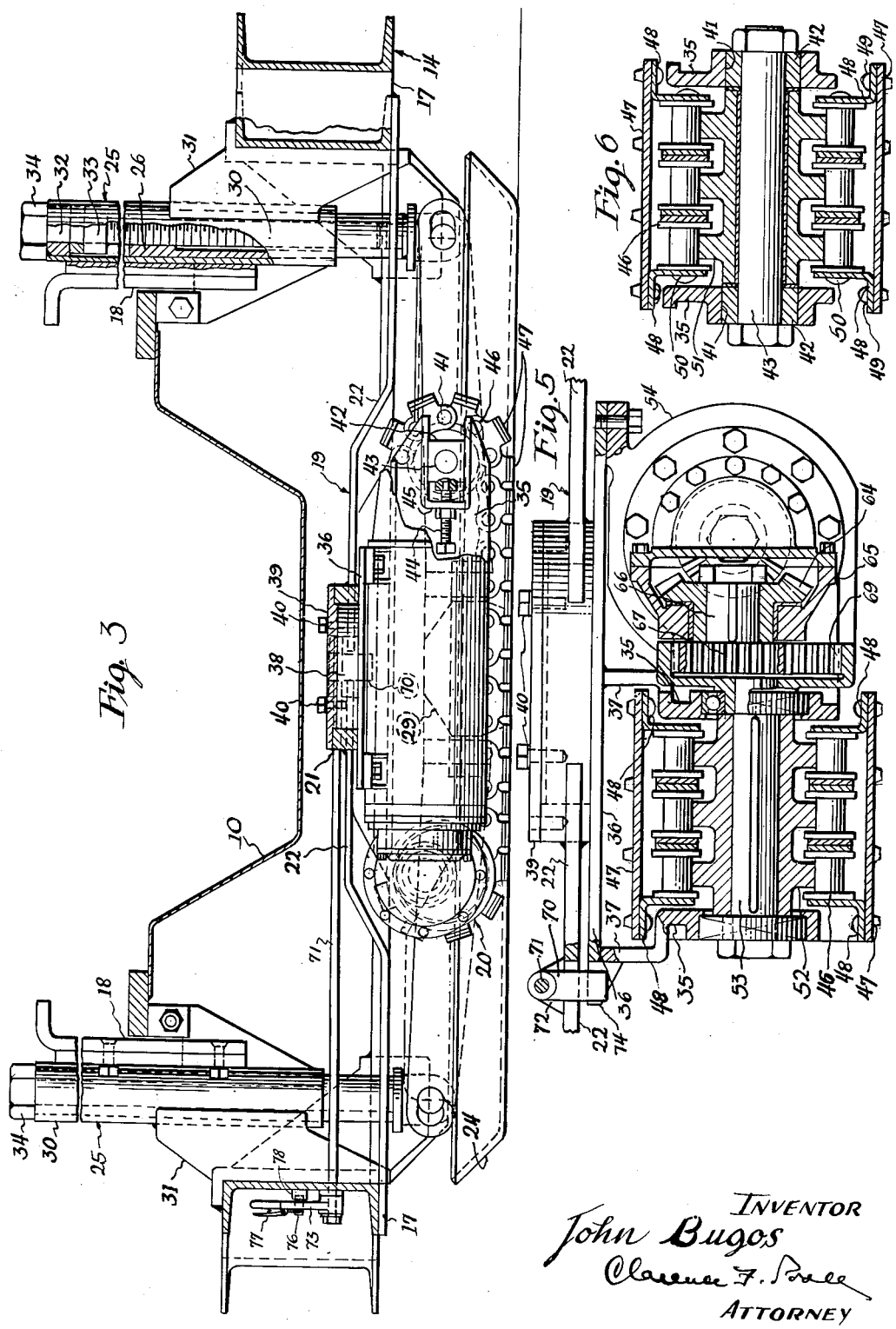

Patented Jan. 8, 1952

2,581,356

UNITED STATES PATENT OFFICE 2,581,356

SELF-LOADING DEVICE FOR SHAKER CONVEYERS

John Bugos, Alpha, Ill., assignor to Goodman Manufacturing Company, Chicago, Ill., a corporation of Illinois Application February 27, 1947, Serial No. 731,309

7 Claims. (Cl. 198—14)

This invention relates to improvements in self-loading devices for shaker conveyors of the type particularly adapted to pick up loose material such as coal, rock, or the like from the ground in mines underground.

The principal object of my invention is to provide a novel, simple and efficient form of self-loading device for shaker conveyors including an improved form of continuous tread traction device located beneath the extensible pick-up trough of the conveyor for swinging the loading device from side to side and adjustable into position to move the loading device in a longitudinal direction, to permit extension of the shaker conveyor trough line when desired.

This and other objects of my invention will appear from time to time as the following specification proceeds and with reference to the accompanying drawings wherein:

Figure 1 is a top plan view of a loading device constructed in accordance with my invention with certain parts thereof broken away;

Figure 2 is an enlarged fragmentary view in side elevation of the loading device, showing certain details of the continuous tread devices for swinging the conveyor from side to side;

Figure 3 is an enlarged transverse sectional view taken substantially along line 3—3 of Fig. 1;

Figure 5 is an enlarged sectional view taken substantially along line 5—5 of Figure 4; and Figure 6 is a sectional view taken substantially along line 6—6 of Figure 4 and drawn to substantially the same scale as Figure 5.

Figure 4:
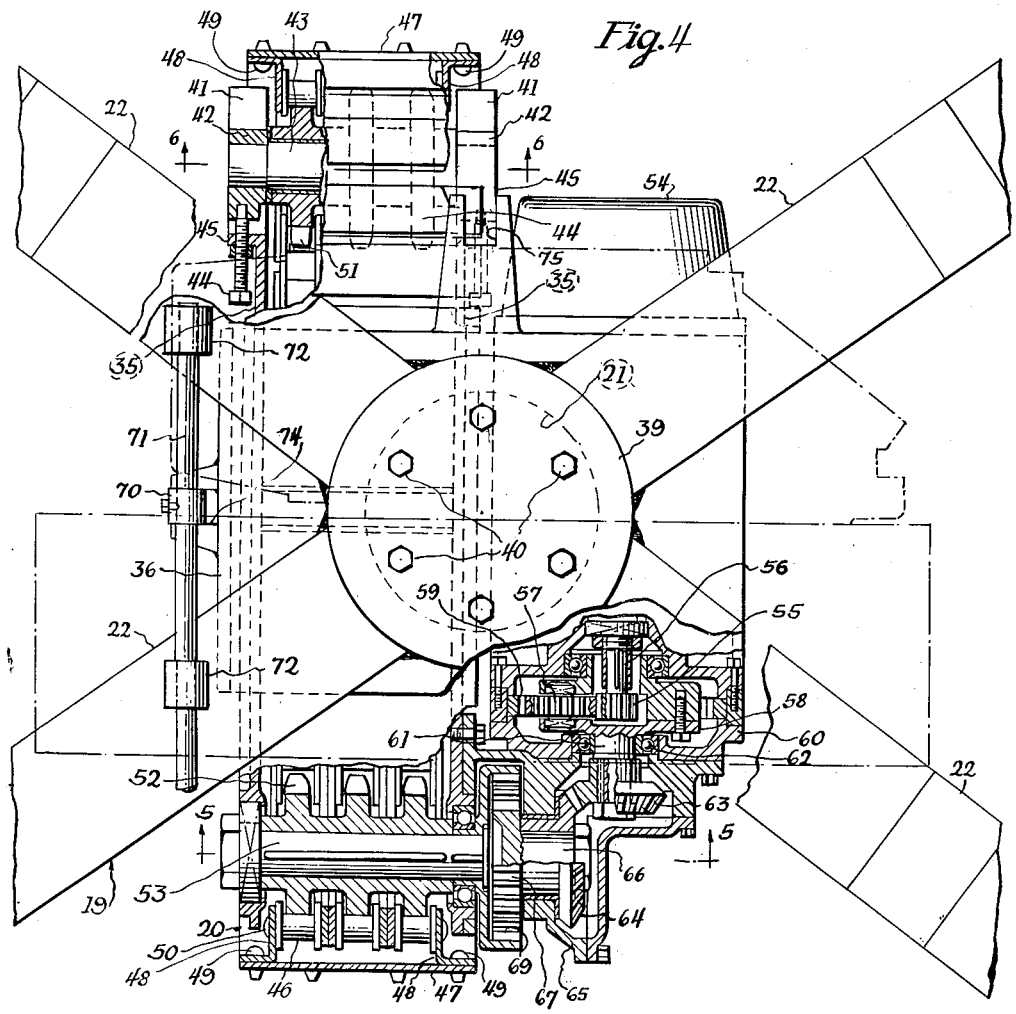
Figure 4 is an enlarged plan view of the loading device, with the conveyor trough sections removed and certain parts of the continuous tread device broken away and certain parts shown in substantially horizontal section.

In the drawings the embodiment of my invention illustrated therein includes generally a pick-up member or extensible trough 10 having a shovel 11 on its forward end for picking up loose material from the ground. Said extensible trough is mounted for extensible or retractible movement with respect to a reciprocating trough 12 and is extensibly or retractibly moved with respect thereto by the action of the conveyor by means of a friction grip feeding device 13. Said feeding device may be similiar to that shown and described in Patent No. 2,318,808 which issued to W. W. Sloane on May 11, 1943, and is no part of my present invention so will not herein be shown or described further.

The reciprocating and extensible troughs 12 and 10, respectively, are reciprocably supported and guided in an elongated guide frame 14 extending along opposite sides of said troughs and connected at its rear end to a swivel 15 (see Figure 1). Said frame is held from reciprocable movement during operation of the conveyor by means of said swivel and serves as a guide means for said troughs, for guiding said troughs for lateral movement about said swivel. Said swivel is only partially shown in Figure 1 since it may be of any well known form as disclosed in Bergmann Patent No. 2,425,078 issued September 12, 1950, and is no part of my invention, and includes a plurality of articulated troughs indicated generally by reference character 16 reciprocably guided in a suitable frame or base (not shown), and connected to the inby end of a shaker conveyor trough line (not shown), to cause material to flow from said reciprocating trough to said trough line when said reciprocating and extensible troughs are to either side of the longitudinal center line of said trough line. The supporting frame for said articulated troughs may be held in position on the ground by means of suitable jacks or the like interposed between said swivel and the mine roof, in a manner well known to those skilled in the art and not herein shown since it is no part of my present invention.

The non-reciprocating guide frame 14, as herein shown, includes two side frame members 17, 17 suitably connected at their rear ends to said swivel, for lateral swinging movement with respect thereto, and spaced outwardly from and extending along the extensible and reciprocating troughs 10 and 12, to a point forwardly of the forward end of said reciprocating trough. Said side frame members have bearing engagement with opposite sides of said extensible trough, as indicated by reference characters 18, 18 in Figures 1 and 3, so that lateral movement of said frame about the swivel 15 will cause lateral movement of said extensible and reciprocating troughs. Said side frame members are connected together adjacent their forward ends by means of an X-brace 19, herein shown as having a continuous tread device 20 mounted thereon for adjustable movement with respect thereto about a vertical axis. Said tread device is herein shown as being mounted on an annular bearing member 21, which has the inner ends of frame members 22, 22 of said X-brace secured thereto, as by welding.

The forward end of the elongated non-reciprocating frame 14 is adjustably connected to and supported on a ground engaging shoe 24, extending transversely beneath said frame and connected with said frame through adjustable screw devices 25, 25 (see Figures 2 and 3). Said screw devices serve to elevate the forward end of said frame and lift the continuous tread device 20 above the ground, to permit said continuous tread device to be moved into a position extending longitudinally of the trough line, to extend the trough line by power, or to a transversely extending position, to swing the troughs 10 and 12 laterally about the swivel 15. Said screw devices also serve to lift said shoe above the ground so the forward end of said frame may be wholly supported on said tread device when it is desired to move said frame by said tread device.

The screw devices 25, 25 include two laterally spaced vertically extending sleeves 26, 26, internally threaded at their upper ends and pivotally connected at their lower ends to opposite ends of a transverse bar 27, for movement about axes extending longitudinally of the frame 14. Said transverse bar 27 is pivotally mounted intermediate its ends between spaced upright ears 29, 29 for movement about axes extending transversely and longitudinally of the trough line, in a manner similar to that shown and described in Patent No. 2,343,144, which issued to L. D. Hagenbook on February 29, 1944, so not herein shown or described in detail. A sleeve 30 is slidably mounted on each upright sleeve 26 for movement therealong. Said sleeve 30 is also mounted on the inside of a side frame member 17 of the non-reciprocating frame 14 by means of a connecting bracket 31 extending inwardly of said side frame member, and connected thereto and to said sleeve, as by welding. The sleeve 30 is closed at its upper end and has a threaded rod 32 mounted therein for rotational movement with respect thereto about the axis of said sleeve. Said rod extends downwardly along said sleeve and is threaded within the threaded upper end of the sleeve 26. A collar 33 is secured to said threaded rod beneath the closed upper end of said sleeve 30, and a nut 34 is secured to the upper end of said threaded rod and abuts the upper end of the closed portion of said sleeve. The nuts 34, 34 may be turned separately or together to vertically move said frame 14 in an obvious manner.

Referring now to certain details of the continuous tread device 20 and its mounting on the X-brace 19, two parallel spaced side plates 35 are suitably connected together intermediate their ends and form a tread frame for said continuous tread device. Said side plates are also connected to the bottom of a plate 36 by means of upright projections 37, 37, projecting upwardly from said side plates on the outsides of said tread devices, and herein shown as being welded to the bottom of said plate 36 (see Figure 5).

A boss 38 projects upwardly from the plate 36 and is herein shown as being rotatably mounted in the annular bearing member 21 at the center of the X-brace 19 (see Figure 3). The central portion of the X-brace 19 is recessed upwardly so as to recess the continuous tread device 20 upwardly within the frame 14 and prevent said tread device from increasing the vertical dimensions of the loading device. A cap piece 39 is secured to the top of the boss 38 and extends along the top of the bearing member 21, and is secured to said boss by means of cap screws 40, 40, to hold said boss and the continuous tread device to said X-brace and permit said continuous tread device to be moved about the axis of said bearing member when it is lifted above the ground by operation of the screw devices 25, 25.

The side plates 35, 35 each have a longitudinally extending guide slot 41 at one end thereof. Said guide slots are aligned and are each adapted to slidably receive a support block 42 for a transverse shaft 43. Adjusting screws 44, 44 threaded in rear outwardly extending shouldered portions 45, 45 of the guides 41, 41 are adapted to have engagement with said support blocks and form a means for adjusting the tension of endless chains 46, 46, forming the power transmitting member of said tread device.

As herein shown, three endless chains 46 are connected together in side by side relation with respect to each other and have ground engaging bearing plates 47, 47 spaced outwardly therefrom and mounted on the horizontal legs of angles 48, 48, as by rivets 49, 49. The vertical legs of said angles are mounted on the ends of pins 50, 50 which extend through the links of said chains and serve as a bearing means therefor. Said endless chains are trained around idler sprockets 51, 51, herein shown as being integrally formed and journaled on the transverse shaft 43. Said chains extend from said idler sprockets to and around drive sprockets 52, 52 keyed on a transverse shaft 53, at the opposite ends of said side plates 35, 35 from said idler sprockets, and suitably journaled in said side plates (see Figure 4).

A motor 54 suitably mounted on the bottom of the plate 36 and the outside of one side plate 35, is provided to drive the drive sprocket 52 and the chains 46, 46. Said motor is herein shown as being a well known form of reversible electric motor and the drive connection from said motor to said chains includes a motor pinion 55 on the end of an armature shaft 56 of said motor (see Figure 4). Said pinion meshes with a planetary pinion 57 journaled in a cage 58, and meshing with an internal gear 59 secured to the inside of a casing 60, which is secured to the end of said motor and forms a housing for said motor pinion and the planetary gear reduction mechanism driven thereby. Said internal gear being stationary, rotation of the motor pinion 55 will orbitally drive said planetary pinion about said internal gear and will rotatably drive said cage at a reduced speed in an obvious manner. A shaft 61 is herein shown as being formed integrally with said cage and as being journaled on the end of said casing 60 on a ball bearing 62. A bevel pinion 63 is keyed on the end of said shaft and meshes with a bevel gear 64 journaled on its hub in a housing 65 for said bevel gear and pinion and secured to and projecting outwardly from the side plate 35. A shaft 66 is keyed in the hub of said bevel gear and has a pinion 67 herein shown as being formed integrally therewith. Said pinion meshes with an internal gear 69 keyed on its hub on the shaft 53, for driving said shaft and the sprockets 52, 52 and chains 46, 46.

A means is provided to lock the continuous tread device 20 in a laterally or longitudinally extended position with respect to the extensible and reciprocating troughs 10 and 12, which as herein shown, includes a locking plate 70 mounted on a transverse shaft 71 intermediate the frame members 22, 22 of the X-brace 19. Said shaft is pivotally mounted in a pair of spaced bearing bosses 72, 72 which are mounted on opposite sides of said frame members 22, 22, and extends laterally therefrom through the left-hand side frame member 17. A hand lever 73 is mounted on the outer end of said shaft, to move said locking plate into position to engage either one of a pair of slotted portions 74, 75 projecting from the sides of the plate 36 and located 90 degrees apart, to permit said locking plate to lock said plate 36 and the continuous tread device 20 in a longitudinally or laterally extending position with respect to the troughs 10 and 12. A spring pressed pin 76 is slidably mounted in the hand lever 73 and is actuated by a hand lever 77 pivotally mounted on the hand lever 73 and engageable with one of a plurality of apertured bosses 78, 78, projecting from the left-hand side frame 17, to lock said locking plate in an engaged or disengaged position with respect to either of the slots 74, 75 (see Figures 3, 4 and 5).

It may be seen from the foregoing that when it is desired to swing the troughs 10 and 12 laterally, and the continuous tread device 20 is in the laterally extending position shown in Figures 1, 3 and 4, that the shoe 24 may be moved out of engagement with the ground so the weight of the non-reciprocating frame 14 and troughs 10 and 12 will be taken on said tread device. The motor 54 may then be started in one direction or another, depending upon the direction it is desired to move said tread device, to drive said tread device 20 and laterally move said troughs about the swivel 15.

When it is desired to extend the trough line, the swivel 15 may be disconnected from the inby end of the trough line, and the forward end of the non-reciprocating frame 14 may be raised by means of the screw devices 25, 25, to elevate said continuous tread device above the ground. The locking plate 70 may then be released from the slot 74 by operation of the hand lever 73 and said continuous tread device may be turned about the axis of the bearing boss 38 to a longitudinally extending position with respect to the troughs 10 and 12, as shown by broken lines in Figure 4, and may be locked in that position by engagement of said locking plate with the slot 75. The frame 14 and the troughs 10 and 12 may then be lowered to permit said continuous tread device to engage the ground, and the shoe 24 may be lifted above the ground by said screw devices. Starting of the motor 54 in the proper direction will then drive said continuous tread device and advance said extensible and reciprocating troughs in an obvious manner.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a self-loading device for shaker conveyors and in combination with a swivelable shaker conveyor trough line including a swivel trough and a reciprocating trough discharging its contents into the forward end of said swivel trough, an extensible trough mounted for extensible movement with respect to said reciprocating trough and having a shovel on its forward end, a frame connected with said swivel and extending along said reciprocating and extensible troughs and forming a non-reciprocating guide means therefor, a single power driven continuous tread crawler type traction device mounted on said frame entirely beneath said troughs and pivotally movable into one position to move said troughs laterally and into another position to advance said reciprocating and extensible troughs with respect to the trough line, to permit extension of said trough line, and means disposed adjacent the forward end of said frame for elevating said frame and troughs and raising said continuous tread device above the ground, to permit said tread device to be moved into longitudinally or transversely extending positions with respect to said troughs.

2. In a self-loading device for shaker conveyors and in combination with a swivelable shaker conveyor trough line including a swivel trough and a reciprocating trough discharging its contents into the forward end of said swivel trough, an extensible trough mounted for extensible movement with respect to said reciprocating trough and having a shovel on its forward end, a frame connected with said swivel and extending along said reciprocating and extensible troughs and forming a non-reciprocating guide means therefor, a single power driven continuous tread crawler type traction device mounted on said frame entirely beneath said troughs and pivotally movable into one position to move said troughs laterally and into another position to advance said reciprocating and extensible troughs with respect to the trough line, to permit extension of said trough line, means disposed adjacent the forward end of said frame for elevating said frame and troughs and raising said continuous tread device above the ground, to permit said continuous tread device to be moved into longitudinally or transversely extending position with respect to said troughs, and means selectively operable for locking said continuous tread device in its various desired positions of adjustment.

3. In a self-loading device for shaker conveyors and in combination with a swivelable shaker conveyor trough line including a swivel trough and a reciprocating trough discharging its contents into the forward end of said swivel trough, an extensible trough mounted for extensible movement with respect to said reciprocating trough and having a shovel on its forward end, a frame connected with said swivel and extending along said reciprocating and extensible troughs and forming a non-reciprocating guide means therefor, and self-contained power operated means mounted on said frame beneath said troughs, for swinging said troughs laterally and for advancing said troughs and frame with respect to said trough line, including a tread frame, a motor mounted to one side of said tread frame, a continuous tread traction device guided for movement about said tread frame, a drive connection from said motor to said continuous tread traction device and a pivotal connection between said tread frame and said non-reciprocating frame, for pivotally mounting said tread frame on said frame so said tread device may be moved into position to support said non-reciprocating frame above the ground and move said frame and troughs laterally, and may also be moved into position to advance said frame and troughs with respect to the shaker conveyor trough line.

4. In a self-loading device for shaker conveyors and in combination with a swivelable shaker conveyor trough line including a swivel trough and a reciprocating trough discharging its contents into the forward end of said swivel trough, an extensible trough mounted for extensible movement with respect to said reciprocating trough and having a shovel on its forward end, a frame connected with said swivel and extending along said reciprocating and extensible troughs and forming a non-reciprocating guide means therefor, and self-contained power operated means mounted on said frame beneath said troughs for swinging said troughs laterally and for advancing said troughs and frame with respect to said trough line, including a tread frame, a motor mounted to one side of said tread frame, a continuous tread traction device guided for movement about said tread frame, a drive connection from said motor to said continuous tread traction device and a pivotal connection between said tread frame and said non-reciprocating frame, a shoe adapted to engage the ground at the forward end of said non-reciprocating frame and an adjustable connection between said shoe and the forward end of said frame for elevating said frame and shoe with respect to the ground and raising said tread device above the ground, to permit said tread device to be moved into position to move said frame and troughs laterally about said swivel, and to be moved into position to advance said troughs and swivel with respect to the trough line, to extend the trough line.

5. In a self-loading device for shaker conveyors and in combination with a swivelable shaker conveyor trough line including a swivel trough and a reciprocating trough discharging its contents into the forward end of said swivel trough, an extensible trough mounted for extensible movement with respect to said reciprocating trough and having a shovel on its forward end, a frame connected with said swivel and extending along said reciprocating and extensible troughs and forming a non-reciprocating guide means therefor, and self-contained power operated means mounted on said frame beneath said troughs, for swinging said troughs laterally and for advancing said troughs and frame with respect to said trough line, including a tread frame, a motor mounted to one side of said tread frame, a continuous tread traction device guided for movement about said tread frame, a drive connection from said motor to said continuous tread traction device and a pivotal connection between said tread frame and said non-reciprocating frame, a shoe adapted to engage the ground at the forward end of said non-reciprocating frame and an adjustable connection between said shoe and the forward end of said frame for elevating said frame and shoe with respect to the ground and raising said tread device above the ground, to permit said tread device to be moved into position to move said frame and troughs laterally about said swivel, and to be moved into position to advance said troughs and swivel with respect to the trough line, to extend the trough line, and means selectively operable from one side of said non-reciprocating frame for locking said tread frame and continuous tread device in their various desired positions of adjustment.

6. In a self-loading device for shaker conveyors, a reciprocating trough connected to the inby end of a conveyor trough line, an extensible trough having a gathering shovel on its forward end and mounted for extensible movement with respect to said reciprocating trough, and a single power driven, continuous-tread, crawler type traction device disposed entirely beneath and within the lateral limits of said troughs and pivotally movable into position to move said troughs laterally and longitudinally with respect to said trough line, means for elevating said troughs and raising said continuous-tread device off the ground to provide clearance for moving said continuous tread device into longitudinally or transversely extending positions with respect to said troughs.

7. In a self-loading device for shaker conveyors, a reciprocating trough connected to the inby end of a conveyor trough line, an extensible trough having a gathering shovel on its forward end and mounted for extensible movement with respect to said reciprocating trough, and a single power driven, continuous-tread, crawler type traction device disposed entirely beneath and within the lateral limits of said troughs and pivotally movable into position to move said troughs laterally or longitudinally with respect to said trough line, means for elevating said troughs and raising said continuous-tread device off the ground to provide clearance for moving said continuous-tread device into longitudinally or transversely extending positions with respect to said troughs, and means selectively operable for locking said continuous-tread device in its several desired lateral or longitudinal positions of adjustment.

JOHN BUGOS.

REFERENCES CITED

The following references are of record in the file of this patent:

UNITED STATES PATENTS

| Number | Name | Date |
|---|---|---|
| Re. 22,703 | Holstein | Dec. 11, 1945 |
| 1,346,390 | Stuart | July 13, 1920 |
| 1,586,573 | Newdick | June 1, 1926 |
| 2,343,144 | Hagenbook | Feb. 29, 1944 |
| 2,410,482 | Doberstein | Nov. 5, 1946 |